United States Patent
Salimando

[11] Patent Number: 5,668,859
[45] Date of Patent: Sep. 16, 1997

[54] APPARATUS AND METHOD FOR CONNECTING REMOTE CALLERS TO LOUDSPEAKERS OR OTHER PROJECTING MEANS IN AN EVENT FACILITY

[75] Inventor: Steven C. Salimando, Little Silver, N.J.

[73] Assignee: Lucent Technologies Inc., Murray Hill, N.J.

[21] Appl. No.: 365,630

[22] Filed: Dec. 28, 1994

[51] Int. Cl.⁶ .................................................. H04M 11/00
[52] U.S. Cl. ........................................ 379/101.01; 381/77
[58] Field of Search ........................... 379/90, 93, 97–99, 379/101, 77, 88, 92, 344, 345, 387–390, 395, 442; 381/77, 80, 82, 118; 348/1, 12, 13; 455/2, 5.1

[56] References Cited

U.S. PATENT DOCUMENTS

| | | |
|---|---|---|
| 4,162,377 | 7/1979 | Mearns . |
| 4,277,649 | 7/1981 | Sheinbein . |
| 4,451,700 | 5/1984 | Kempner et al. . |
| 4,475,189 | 10/1984 | Herr et al. . |
| 4,481,383 | 11/1984 | Madon . |
| 4,539,435 | 9/1985 | Eckmann ................................ 379/77 |
| 4,540,850 | 9/1985 | Herr et al. . |
| 4,544,804 | 10/1985 | Herr et al. . |
| 4,550,224 | 10/1985 | Winchell . |
| 4,577,065 | 3/1986 | Frey et al. . |
| 4,592,546 | 6/1986 | Fascenda et al. . |
| 4,635,251 | 1/1987 | Stanley et al. . |
| 4,653,045 | 3/1987 | Stanley et al. . |
| 4,691,347 | 9/1987 | Stanley et al. . |
| 4,939,773 | 7/1990 | Katz ....................................... 379/88 |
| 4,965,819 | 10/1990 | Kannes . |
| 5,019,736 | 5/1991 | Pearson et al. . |
| 5,034,807 | 7/1991 | Von Kohorn . |
| 5,057,915 | 10/1991 | Von Kohorn . |
| 5,120,076 | 6/1992 | Luxenberg et al. . |
| 5,163,087 | 11/1992 | Kaplan . |
| 5,186,471 | 2/1993 | Vancraeynest . |
| 5,191,615 | 3/1993 | Aldava et al. . |
| 5,224,151 | 6/1993 | Bowen et al. . |
| 5,255,326 | 10/1993 | Stevenson . |
| 5,263,723 | 11/1993 | Pearson et al. ....................... 379/92 |
| 5,273,288 | 12/1993 | Teshima et al. . |
| 5,273,437 | 12/1993 | Caldwell et al. . |
| 5,297,802 | 3/1994 | Pocock et al. ....................... 379/88 |
| 5,354,069 | 10/1994 | Guttman et al. . |
| 5,365,583 | 11/1994 | Huang et al. . |
| 5,398,278 | 3/1995 | Brotz .................................... 379/90 |
| 5,490,207 | 2/1996 | Schorr .................................. 379/92 |
| 5,508,731 | 4/1996 | Kohorn .................................. 455/2 |

OTHER PUBLICATIONS

Rey, R.F., "Engineering and Operations in the Bell System," Technical Editor, 2nd Edition, AT&T Bell Laboratories, 1982–1983, pp.503–504.

*Primary Examiner*—Wing F. Chan

[57] ABSTRACT

Connection of a communication initiated by a user over a telephone, computer or cable network to a projector in arena or other event facility during an event. A user terminal is connected to the network and operative to initiate the communication from the user. Routing circuitry directs information in the user communication to the arena. A controller receives and processes the information in the user communication, and projectors in the arena project during the event a signal corresponding to information in the user communication. The signal may be an audio signal corresponding to voice information from the user and the projectors may be a set of loudspeakers. The voice information from the user may thus be projected within the arena as it is received. Alternatively, the number of incoming calls may be counted to determine a volume level for a set of loudspeakers which projects random applause through the arena, such that the user can influence the noise level in the arena at a particular time. A visual display or video projector, such as a large video screen, may be used to project a video signal corresponding to information in the user communications.

17 Claims, 3 Drawing Sheets

5,668,859

APPARATUS AND METHOD FOR CONNECTING REMOTE CALLERS TO LOUDSPEAKERS OR OTHER PROJECTING MEANS IN AN EVENT FACILITY

FIELD OF THE INVENTION

The present invention relates generally to improvements in telecommunication systems. More particularly, the present invention relates to techniques for connecting inbound calls or other remote user communications to loudspeakers or other projecting means in an arena, stadium or other facility such that the caller can, for example, provide voice information which is projected in the facility at a time determined by the caller.

BACKGROUND OF THE INVENTION

Interactive services have become increasingly popular and widespread with the introduction of computer communication networks such as the Internet along with other rapidly-advancing developments in the telephone, cable and computer industries. These advancements have led to the implementation of interactive services such as home-based shopping, remote classrooms with satellite hook-ups to central teaching facilities, and the like. At the same time, it has generally become more difficult for substantial portions of the general population to personally attend and actively participate in, for example, live sporting, entertainment or political events held in large arenas, stadiums or other facilities. This may be attributed to, for example, difficulties arising from traffic, crowds and excessive travel expenses, as well as from rapidly escalating demand which, in the case of major sporting events, often makes tickets prohibitively expensive or otherwise very difficult to obtain. Despite the apparent advances in interactive services, most people are still limited to passively viewing these events on television.

A known approach which attempts to alleviate this problem is disclosed in U.S. Pat. No. 5,034,807. This patent describes a system which permits remote users watching a sporting or other event on television to enter predictions regarding the outcome of the event itself or various other unknown results. Those watching the event on a television enter their predictions using specially-designed response equipment. A central broadcast station transmits instructional signals which identify the content and form of an acceptable response, and the response equipment at a particular remote user site keeps track of whether or not the predictions of that remote user were correct. Although this system provides some measure of remote audience participation in the event, it generally utilizes non-standard equipment at the remote user site. The substantial expense of providing the specially-designed response equipment at each remote user site may unduly limit the number of users which can utilize the system. In addition, the usefulness of the system is further limited in certain applications, such as sporting events, due to legal restrictions on gambling. Perhaps most importantly, the users of such a system are only participating in the actual event in a very limited sense. For example, the remote users are unable to participate in a live sporting event such that their collective presence is apparent to the players and other fans within the arena itself.

U.S. Pat. No. 4,592,546 discloses a similar system in which remote users predict upcoming plays in conjunction with a live sporting event such as a football game. The remote users enter their predictions via a game console at the remote site, and the predictions are checked in the game console against information transmitted in an FM subcarrier communication channel. After the event, the remote users download their results via modem over the phone line to a central computer for verification. Unfortunately, this system also suffers from the above problems of expensive specialized equipment at the remote sites, possible gambling restrictions, and very limited remote user participation.

Other systems have been developed which allow remote users to provide input regarding, for example, survey questions. U.S. Pat. No. 4,451,700 discloses an automatic audience survey system in which a remote audience is polled on a question of interest via a television or radio. Members of the audience enter a response over a telephone, and the responses are compiled and broadcast to the audience in real time. However, the audience participation in this system is limited to providing a simple response to the survey question. Although these and other known interactive systems may provide some improvements over completely passive remote observation of an event, further improvements are necessary to provide a more meaningful role for those unable to physically attend.

As is apparent from the above, a need exists for a system which provides remote users with access to loudspeakers or other projecting means within an event facility such that communications from the remote users can influence noise levels or otherwise be made apparent in the facility during the event.

SUMMARY OF THE INVENTION

The present invention involves efficiently routing information from a potentially large volume of inbound callers or other remote users to loudspeakers or other audible or visual projecting means at an event facility, such that the remote users can provide inputs over a finite time span which are broadcast or otherwise utilized in the facility. The invention is referred to generally herein as "effective barrage calling."

In accordance with one aspect of the invention, an apparatus is provided which may include a user terminal connected to a cable, computer or telephone network and operative to initiate a communication from the user. Routing means direct information in the user communication to an arena or other event facility. The routing means may be, for example, part of a telephone switching network which includes equipment for pooling calls or otherwise concentrating information in the user communications, and for storing and forwarding information to the event facility. Control means which may be, for example, located at the event facility, receive and process the information in the user communication. Projecting means such as a set of loudspeakers are located at the arena or other facility and are responsive to the control means for projecting in the arena during an event a signal corresponding to information in one or more of the user communications.

In accordance with one aspect of the present invention, a user communication in the form of a telephone call is directly routed to a speaker controller in an arena such that voice information from the user is projected over a set of loudspeakers into the arena in real time as the information is received. Each user may project his or her voice into the arena in this manner for a particular period of time, and at a volume level which is about as loud as that of someone actually present in the arena. The total arena loudspeaker output volume is a function of the number of callers which have accessed and are using the system at a given time, such that if a sufficient number of remote users call in, the total decibel level in the arena can be raised significantly.

In accordance with another aspect of the invention, the user communication itself is not directly projected into the arena. Instead, the number of user communications occurring at a particular time may be counted or otherwise characterized in order to determine an appropriate volume level for loudspeakers projecting random applause, cheers and the like within the arena. The random applause may be previously recorded such that it is similar to the combined audible output of a large number of users actually present at an event.

In accordance with a further aspect of the invention, a remote user communication includes dual-tone multiple-frequency (DTMF) commands entered from, for example, a touch-tone telephone. The user enters the DTMF commands in response to a predetermined menu of selections which is announced or otherwise made known to the user. A processor located, for example, at the event facility then detects the DTMF commands to determine, for example, which of a number of available previously-recorded signals the user has selected for projection in the arena.

Other embodiments of the invention may utilize a visual display or other visual projecting means rather than an audible projecting means such as a set of loudspeakers. An exemplary visual projecting means may include a large video screen which is visible to players, fans and others who may be present in the arena. The video screen could project visual indications of information communicated by the remote users. Such information could include, for example, indications of remote callers' opinions regarding how a decision facing a team should be decided, such as either removing or staying with a struggling pitcher in a baseball game, attempting a first down or punting in a football game, and the like. Similarly, information from the remote users regarding their position on, for example, a course of action being debated in a public meeting, political convention, or even within a legislative facility such as the U.S. Senate or House of Representatives, could be projected such that it is audibly or visually apparent to those physically present.

The effective barrage calling of the present invention permits users remote from an actual event site to participate in the event in a more meaningful and interesting manner than heretofore possible. The presence of the remote users can be made apparent within the arena or other location of the live event at a time and in a manner substantially controlled by the users. The invention is particularly well-suited for large sporting, entertainment or political events in which users may wish to cheer on, for example, a player, performer, team or proposition which might otherwise be ignored or heckled by the actual on-site audience.

The above discussed features, as well as additional features and advantages of the present invention, will become apparent by reference to the following detailed description and accompanying drawings.

DETAILED DESCRIPTION

Although the present invention will be described herein in conjunction with an illustrative embodiment in which remote users are provided access to a set of loudspeakers in an arena or other event facility, it should be understood that this is by way of example and not limitation. Other embodiments of the invention may utilize other audible or visual projecting means including video screens or other display mechanisms. The remote users may be provided with arena access over a two-way cable network, a telephone network, a computer network or other suitable means for routing a user communication. In addition, the processing of remote user communications may be performed at the event facility itself or at another location remote from the facility. These and any of a number of other alternative implementations of the effective barrage calling of the present invention will be apparent to those skilled in the art.

Figure 1:
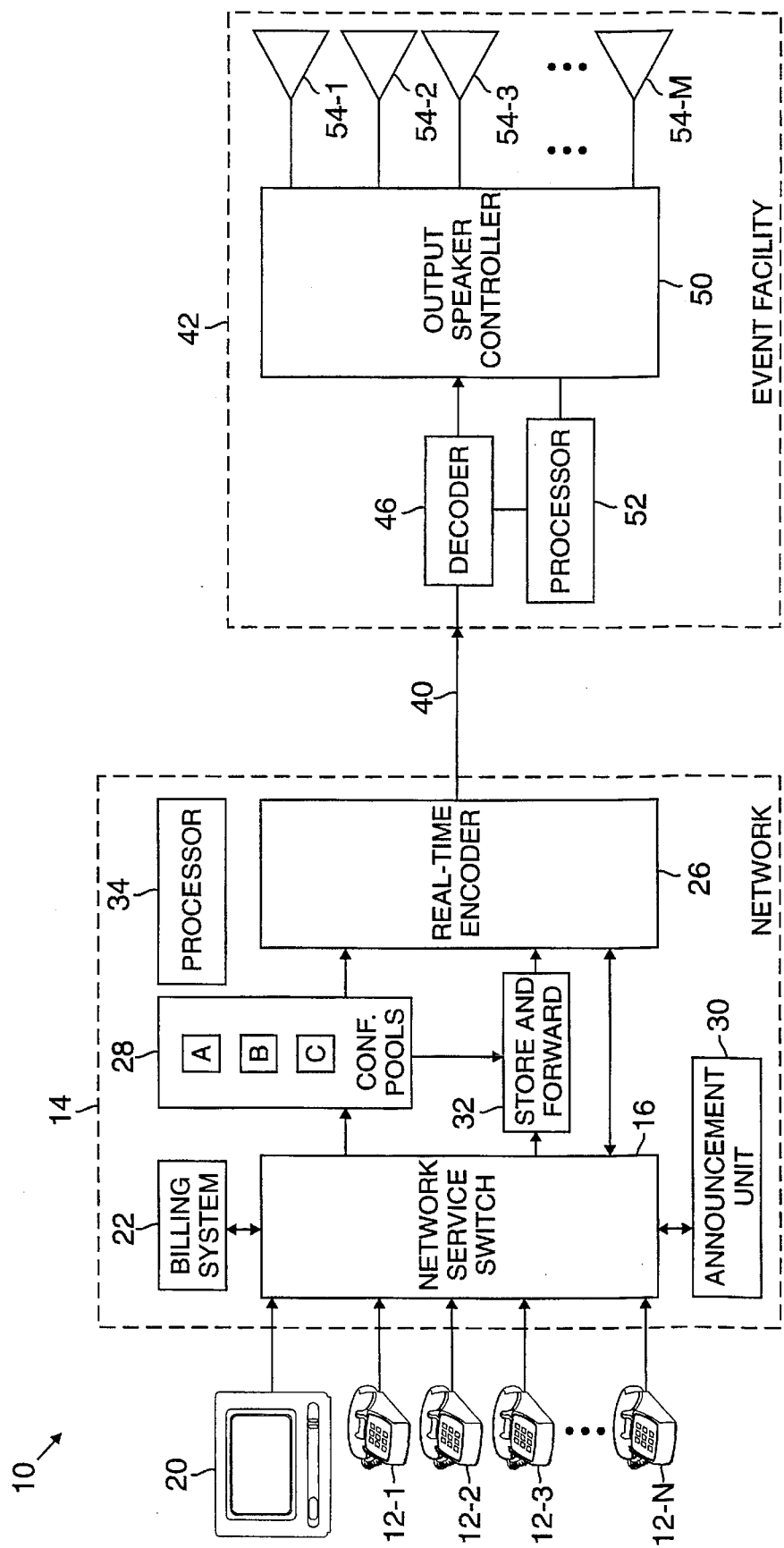
FIG. 1 shows an exemplary telecommunication system which provides remote caller access to event facility loudspeakers in accordance with the invention.

FIG. 1 shows an exemplary telecommunication system 10 suitable for providing effective barrage calling in accordance with the present invention. The system 10 utilizes a telephone network 14 to provide voice connections between remote callers and an event facility 42 such as an arena. The system 10 includes a plurality of telephones 12-n, n=1, 2, . . . N, which serve as plain old telephone service (POTS) user terminals in this embodiment. Alternatively, telephones 12-n could provide access to an integrated services digital network (ISDN) line as well as to other types of voice and/or data lines. The telephones 12-n are connected to a telephone switching network 14 which includes a network service switch 16. The telephones 12-n are used to initiate a call to the event facility during a particular event. Calls may also be initiated using a video terminal 20 which may be, for example, a television set equipped with an interactive service feature, such as two-way cable, or a computer equipped with a modem and connected over a telephone or other communication line to a computer network. A call may be initiated from video terminal 20 by, for example, a user pressing a predetermined key on a remote control device or otherwise entering a suitable command to select an option displayed on the terminal. The network service switch 16 receives user communications from the telephones 12-n, video terminal 20, or other user terminals and directs the calls through network 14 in a suitable manner. For purposes of the present specification, the term "call" will refer to any user communication initiated via a telephone, computer, video terminal, two-way cable television set-top box or any other type of user terminal. A "user communication" refers to any type of information, including voice information, analog or digital data, dual-tone multiple-frequency (DTMF) commands and the like, which is transmitted from a user terminal by a remote user. The exemplary user terminals 12-n and 20 could be placed at any remote location which has access to a telecommunication service.

The network service switch 16 may include local exchange carrier (LEC) switches as well as long distance or inter-exchange carrier (IXC) switches, all of which are generally well-known in the art. Exemplary network service switches include the 5ESS® and 4ESS® switching systems from American Telephone & Telegraph Company, Inc. (AT&T). Additional details regarding telephone network switches suitable for use with the present invention may be found in, for example, U.S. Pat. Nos. 4,162,377, entitled "Data Base Auto Bill Calling Using CCIS Direct Signaling," and 4,277,649, entitled "Method and Apparatus for Screening Telephone Calls," both assigned to the assignee of the present invention and incorporated by reference herein. The network service switch 16 may incorporate common channel signalling (CCS) capability such as that described in more detail in the above-cited U.S. Patents. The network service switch 16 interacts using CCS or other switching or connection apparatus with a billing system 22 to generate appropriate information regarding charges, such as for use of system 10 or network 14. The billing may be based, for example, on a flat fee or on time duration of the call, or on a suitable combination of the two.

Calls may be connected directly from network service switch 16 to a real-time encoder 26 which multiplexes the calls from several users onto a single multiplexed output line 40 in a known manner. In accordance with the present invention, several incoming calls may be combined into one or more conference pools 28 such that the voice information communicated by several different users is combined into a multiple-user conference or party line suitable for transmission over a connection otherwise allocated to a single-user line. The conference pools A, B, C in element 28 can therefore each correspond to one or more standard single-user voice lines from the user terminals 12-n. The pools may be created in response to different users dialing several different barrage service telephone numbers. A group of users dialing the same barrage service number may want to communicate at the same time and during the same event and their communications can therefore be suitably combined to facilitate connection to the event facility. Other criteria could also be used to create conference pools or other types of multi-user party lines in accordance with the present invention. Further details regarding implementation of conference pools or other multi-user lines are well-known in the art and are therefore not included herein.

In the event too many calls arrive in network 14 at any given time, a store and forward device 32 is able to store incoming calls which cannot be directly passed to real-time encoder 26. The calls can then be forwarded to the real-time encoder 26 at a later time. The conference pools 28 can also interact with the store and forward device 32 such that pooled calls are stored if too many pooled calls arrive at once. The network 14 further includes an announcement unit 30 connected to the network service switch 16. The announcement unit 30 may utilize, for example, the CCS noted above to provide a suitable message to each of the users that initiates a communication through network 14. This message may include an indication to the user regarding which event the user is attempting to access. Network 14 may also include a processor 34 which directs the operation of the other elements in network 14 in a manner well-known in the art. Those skilled in the art will be familiar with the operation of network elements such as the billing system 22, real-time encoder 26, announcement unit 30, store and forward device 32 and processor 34, and further description of these elements is therefore unnecessary.

As noted above, in this embodiment, network 14 and real-time encoder 26 multiplex several single-user lines or multiple-user conference pool lines onto a multiplexed line 40. In this example, the lines are multiplexed using a time-division technique, through alternative embodiments can utilize other techniques including frequency-division multiplexing. The multiplexed line 40 is connected to an event facility 42. The line 40 transmits voice traffic in either analog or digital form. Although only one multiplexed line 40 is shown interconnecting network 14 and event facility 42, it should be emphasized that this is by way of example only. Other embodiments can include multiple lines each of which could be either multiplexed or non-multiplexed. The event facility 42 includes a decoder for decoding the single-user and multiple-user lines which were combined and transmitted over the exemplary multiplexed line 40. Decoder 46 thus separates the multiplexed line 40 into several distinct single-user or multiple-user lines. Any of a number of alternative demultiplexing devices may be used in place of decoder 46. The operation of time-division demultiplexing devices such as decoder 46 is generally well-known in the art.

The decoded user lines are supplied to an output speaker controller 50. A processor 52 controls the operation of various system components in event facility 42, including decoder 46 and output speaker controller 50. The speaker controller 50 is connected to a plurality of loudspeakers 54-n, n=1, 2, . . . M. Speaker controller 50 and processor 52 may be implemented as one or more computers or other digital processors or microprocessors, as application-specific circuits, or as any other suitable combination of hardware, software or firmware. Alternative control means could also be used in place of speaker controller 50 and processor 52. A single-user line or multiple-user conference pool line in this embodiment is directly connected through network 14 and event facility 42 to one or more of the loudspeakers 54-n. The volume of loudspeakers 54-n can be suitably adjusted by controller 50 in order to provide sufficient amplitude for an output signal which is projected into the event facility. The volume may be based upon the number of users calling the system 10 at any particular time. Alternatively, a constant volume level may be used for each caller, such that a significant number of calls are required to provide an output signal which is audible throughout the event facility. In general, the voice information corresponding to a single caller is projected at a volume comparable to that which the caller could produce if physically present in the arena. Certain embodiments of the invention may therefore require calls from a large number of remote users in order to significantly raise the decibel level in the arena.

Although all loudspeakers 54-n are shown as connected to a single controller, other embodiments could utilize several different controllers for controlling separate sets of loudspeakers or individual loudspeakers. The actual arrangement of the loudspeakers 54-n within a particular facility will of course depend upon the nature and layout of the facility. In a sports stadium or other arena, the loudspeakers could be implemented in a manner similar to the public address system. Any of a number of alternative loudspeaker implementations will be apparent to those skilled in the art. For example, the loudspeakers could be distributed within the arena such that sounds produced by the speakers more closely simulate sounds from an actual crowd. In addition, the present invention may be implemented using many different types of loudspeakers.

The decoder 46 in event facility 42 may be part of a private branch exchange (PBX) or other suitable call processing hardware. For example, the decoder 46 may be part of an automatic call distributor (ACD) used to distribute the incoming calls among specific loudspeakers or speaker controllers. ACDs are described in greater detail in, for example, pp. 503–504 of "Engineering and Operations in the Bell System," Second Edition, AT&T Bell Laboratories, Murray Hill, N.J. 1983, which are incorporated by reference herein. In the exemplary embodiment of FIG. 1, the decoder 46 is located within the event facility 42. Alternative embodiments may utilize a decoder 46 or other call processing hardware which is located remote from the event facility 42. For example, the event facility 42 may receive incoming calls from a central office with centrex service. Centrex service generally provides PBX-like features within public switching equipment. Exemplary centrex systems include the Business and Residence Customs Services (BRCS) of the 5ESS® switching system, and the 1AESS® centrex service, both available from AT&T. The present invention may also utilize calling line identity (CLI) information to identify the individual, household or business using a particular user terminal. Additional detail on CLI-based call processing may be found in, for example, the above-cited U.S. Pat. No. 4,277,649. In other embodiments, the event facility 42 or other call processor may utilize automatic number identification (ANI) of a user terminal as described in U.S. Pat. No. 5,163,087 entitled "Delivery of Customer Data Base Key Using Automatic Number Identification," which is assigned to the assignee of the present invention and incorporated by reference herein. Both CLI and ANI can provide the event facility 42 or network 14 with information regarding the user terminal associated with a particular call. This information could be used to, for example, control user billing in billing system 22, or allow event facility 42 to identify whether incoming calls are from users authorized to access the system.

In operation, users watching an event on television or listening over the radio can determine appropriate times at which they would like to have their presence felt in the arena. This may occur when, for example, a favorite player makes a great play, a referee makes a bad call, or at any other time a given user is inclined to cheer, applaud or otherwise vocally respond during the event. A user can then simply initiate a call or other communication to an effective barrage calling service number, and the system 10 provides suitable processing of the call such that voice or other information from the user is projected in the arena. The information is projected in a manner such that it can be made apparent to at least a subset of those actually in attendance at the event. Many users will be inclined to initiate a call when, for example, a favorite team or player is in a hostile arena in which that player or team may be heckled or simply ignored by the actual crowd at the arena. The present invention provides a technique for rectifying this problem by in effect allowing remote users watching the event to participate as if physically present.

Figure 2:
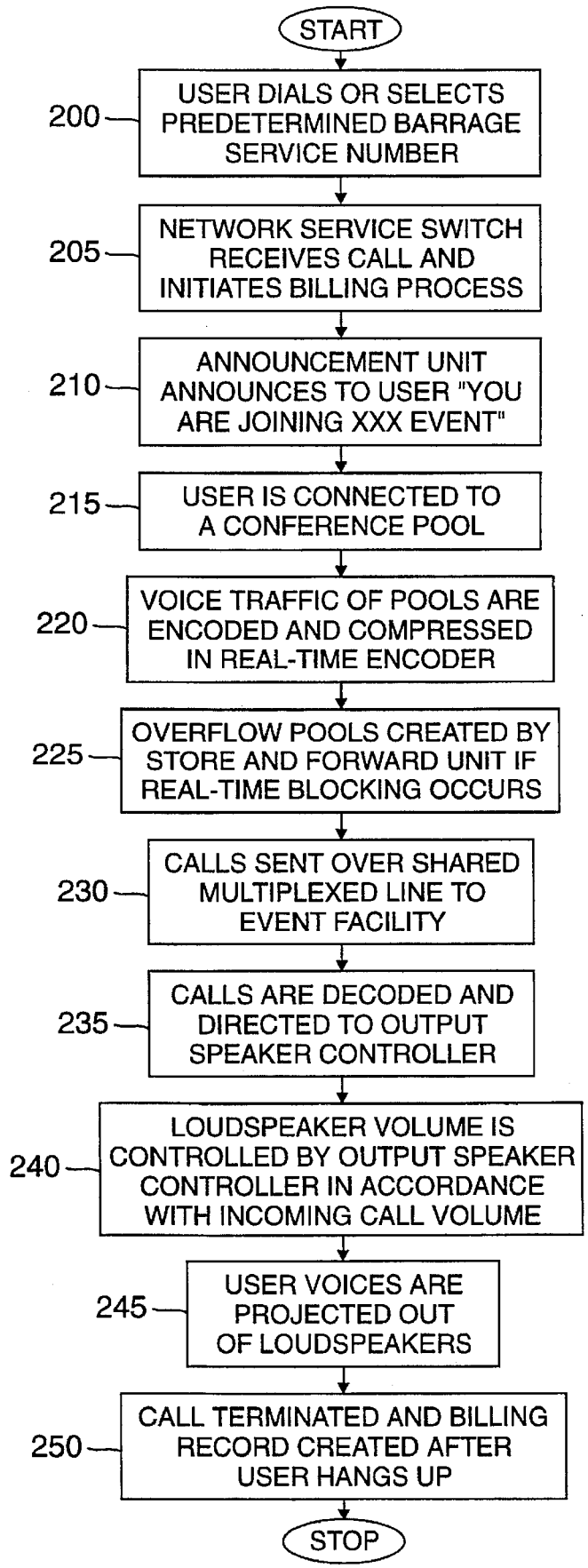
FIG. 2 is a call flow diagram illustrating the operation of the system of FIG. 1.

FIG. 2 shows a call flow diagram illustrating the operation of system 10 in FIG. 1 in accordance with an exemplary embodiment of the present invention. The exemplary call flow is illustrated in steps 200–250. In step 200, a user dials a predetermined effective barrage service number using a telephone 12-n or other suitable user terminal. The barrage service number may be, for example, a 900 service number, an 800 service number, or a regular POTS number. An alternative caller terminal includes the video terminal 20 which may be a television or computer terminal. As noted above, when a video terminal 20 is used, the user may simply select from one of a number of options displayed on the terminal. The calls or other user communications are received in network service switch 16 and a billing process is initiated via billing system 22. The announcement unit 30 provides a suitable announcement to each of the users accessing network 14. A suitable announcement may be one which indicates to the user which event that user is accessing. In a preferred embodiment of the present invention, multiple users calling the same effective barrage service number at the same time are combined into one or more conference pools A, B and C. Real-time encoder 26 encodes and compresses voice information from each multiple-user line corresponding to one of the conference pools. Other single-user calls may be connected directly to the real-time encoder 26 rather than combined with calls of other users into a conference pool. Still other users may be required to have their communications pass through store and forward device 32 prior to accessing real-time encoder 26. The latter situation will arise if real-time blocking occurs in network 14 as a result of, for example, excessive voice traffic. The output of encoder 26 is supplied over the multiplexed line 40 in analog or digital form to the event facility 42.

In facility 42, the multiplexed incoming calls are decoded into multiple-user and single-user lines and directed to a speaker controller 50. The output volume of the loudspeakers 54-n is controlled in accordance with the incoming call volume.

The user communications, which in this example correspond to voice information, are projected into the event facility over the loudspeakers 54-n at a suitable volume level such that the user voice information may be heard within the event facility. A given user may therefore initiate a call and have his voice projected within the event facility at a time during which that user wishes to, for example, cheer on a particular player or team participating in the given event. After the user has projected his or her voice for a predetermined period of time the user may terminate the call by, for example, hanging up the phone. A billing record will then be created via the billing system 22 and the user will be charged for the access to network 14 and event facility 42.

In a preferred embodiment of the present invention, the user voice information is directly supplied to the output loudspeakers 54-n in event facility 42. Alternative embodiments may utilize an indirect connection between an incoming call and the output loudspeakers. For example, the number of incoming calls received at a particular time may be counted using processor 52 and the resulting measurement of call volume used to set an appropriate speaker volume for randomly generated applause. In a large stadium or event facility, in which many users are simultaneously cheering, it generally becomes less important to maintain the precise voice information of any particular user. It therefore may be acceptable to simply provide prerecorded audio at a volume level which is set in accordance with the received call volume. Such embodiments may be used to limit the type of information projected into the facility by the remote users, and thereby prevent the possibility of a remote user introducing profane or otherwise offensive voice information into the facility.

Another alternative embodiment of the invention utilizes a user communication which includes dual-tone multiple-frequency (DTMF) commands generated by the remote user from a touch-tone telephone or other suitable terminal. The DTMF commands may be generated in response to a predetermined menu of selections which is provided by, for example, announcement unit 30 or otherwise made known to the remote user. Possible selections include the type of audio or video signal the remote user wishes to project into the arena at a particular time. For example, certain DTMF commands may correspond to previously-recorded audio signals for different types of cheers, boos and the like. The remote user selects one of the available projections by, for example, pressing a corresponding key on the touch-tone telephone. The DTMF commands are passed through network 14 in a known manner, and supplied to, for example, processor 52 in event facility 42. The processor 52 receives the DTMF commands in the user communication and determines the appropriate signal to be projected in the facility via, for example, the speaker controller 50 and loudspeakers 54-n. In other embodiments, different types of commands may be generated in the user terminal such that remote users can select signals to be projected.

Figure 3:
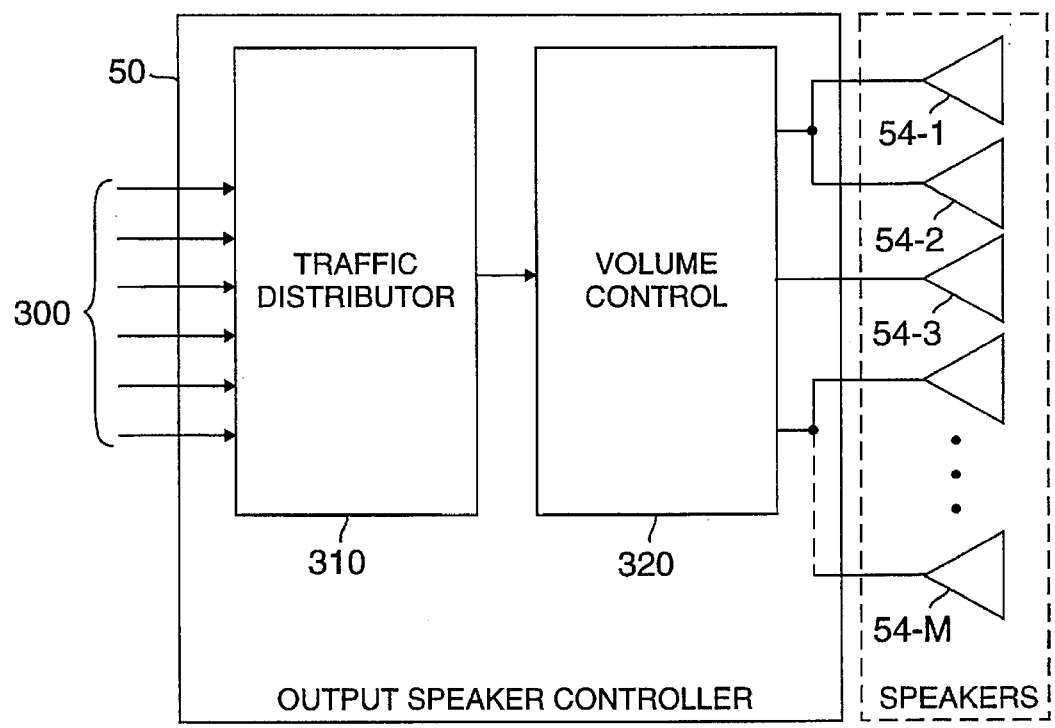
FIG. 3 is a block diagram of an exemplary output speaker controller in accordance with the present invention and suitable for use in the system of FIG. 1.

FIG. 3 illustrates the output speaker controller 50 of FIG. 1 in greater detail. A plurality of input lines 300 are supplied from decoder 46. The lines 300 include both single-user lines and multiple-user lines, and may include voice information in either an analog or digital form. The lines are applied to a traffic distributor 310 which distributes the user communications to a volume control device 320. The volume control device 320 interfaces with and controls the output volume level of the loudspeakers 54-n. The volume control may include, for example, a number of variable gain amplifiers suitable for boosting the amplitude of voice communications supplied from traffic distributor 310. Those skilled in the art can readily determine numerous implementations of circuitry and/or software suitable for providing traffic and volume control in controller 50.

Figure 4:
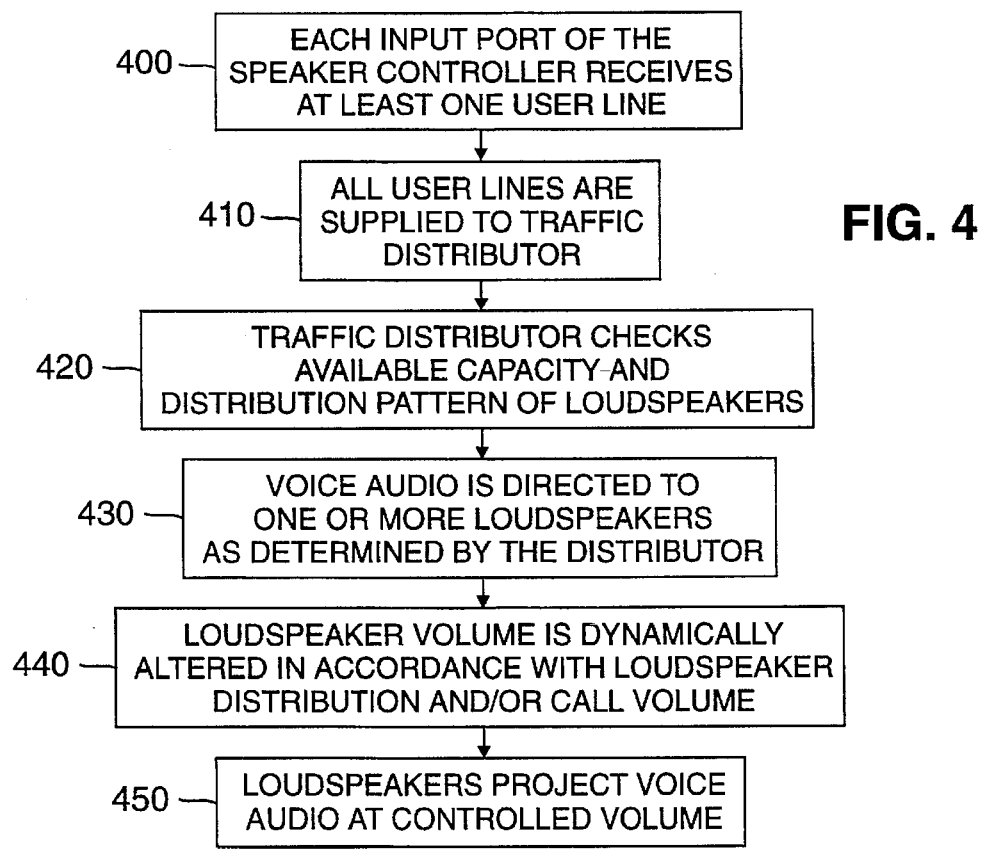
FIG. 4 is a flow diagram illustrating the operation of the speaker controller of FIG. 3.

FIG. 4 is a flow diagram illustrating in steps 400–450 the processing of user communications within speaker controller 50. Each input port of the controller 50 receives one of the lines 300 corresponding to at least one single-user line or multiple-user line. The distributor 310 checks the available capacity of the loudspeakers 54-n and the distribution pattern of calls which are already being supplied to a particular loudspeaker. User communications in the form of voice audio information are directed to one or more of the loudspeakers 54-n in accordance with a desired volume level and distribution pattern. In one embodiment, the volume of the loudspeakers is determined in accordance with the desired distribution and the incoming call volume. As shown in step 450, the loudspeakers project the voice audio at the controlled volume level. The volume is adjusted as additional users access the system such that a maximum volume level is not exceeded. Alternatively, the number of incoming calls may be counted to determine a volume level for a set of loudspeakers which are projecting, for example, random applause throughout the arena. As noted above, in certain embodiments the loudspeaker output volume level is appropriately limited, such that numerous callers must be connected to provide an appreciable increase in decibel levels in the arena at a given time.

There are numerous applications of the embodiment of the present invention illustrated in FIGS. 1 to 4. For example, assume a remote user is watching a televised baseball game in which the score is close and a batter from their favorite team is coming up to bat in the opponent's stadium. The remote user wants to cheer on the batter and therefore calls the barrage service number, receives an announcement or other prompt, and cheers over the telephone. The user's voice is projected out of loudspeakers 54-n into the stadium in the manner previously described. Although the volume at which the user's voice is projected may be limited to a volume level of a normal individual actually present at the stadium, enough users calling in can raise the decibel level in the stadium significantly. The invention is also well-suited for events such as the Olympics, in which remote users in different countries can call in, for example, to cheer on a favorite runner who is about to cross the finish line.

Other embodiments of the invention may utilize a visual display or projecting means rather than an audible projecting means such as a set of loudspeakers. In general, a projecting means in accordance with the invention includes any type of device which projects an audio, video or other type of signal within the event facility. An exemplary visual projecting means may include, for example, a large video screen which is visible to players, fans and others present in the arena. In such an embodiment, speaker control 50 could be replaced with a suitable video control means of a type well-known in the art. The video screen could project visual indications of information communicated by the remote users. Such information could include, for example, an indication of callers' opinions regarding how a decision facing a team should be decided, such as either removing or staying with a struggling pitcher in a baseball game, attempting a first down or punting in a football game, and the like. Similarly, information from the remote users regarding their positions on, for example, a course of action being debated in a public meeting, political convention, or even within a legislative facility such as the U.S. Senate or House of Representatives, could be projected such that the information is apparent to those physically present at the event. It should be readily apparent that the present invention is suitable for use in these and many other applications.

Another alternative embodiment of the invention may allow a remote user to establish a single connection with the event facility and maintain that connection for the duration of the event. Users could be charged an additional service fee for maintaining the connection. In such an embodiment, the remote user or a group of pooled users need not, for example, initiate a new call each time the user or group wishes to convey information via the event facility projecting means. Instead, the user or group remains connected, and initiates communication at various times during the event by, for example, pushing a key on a touchtone telephone, or selecting from a menu of options provided on a television or computer video terminal. In this manner, large numbers of remote users could be serviced while minimizing call setup delay.

Although the above description illustrates the utility of the present invention primarily in terms of connecting inbound callers to arena loudspeakers, it should be understood that the present invention is generally suitable for use with any system in which information communicated from users is projected in an event facility during an event. Many variations may be made in the arrangements shown, including, for example, the use of computer, cable or other telephone networks to convey the information in the user communications to the event facility, the manner in which multiple user communications are combined, and the type of projecting means which is used to project information from the user communications into the event facility. These and other alternatives and variations will be readily apparent to those skilled in the art.

I claim:

1. In an effective barrage telecommunication system in which a potentially large number of users communicate information from user terminals over a network to an event facility with an ongoing event having an audience, an apparatus for directing a communication from a user comprising:

routing means to direct information in the user communication to the event facility;

control means to receive and process the information in the user communication; and projecting means at the event facility responsive to the control means for projecting in the event facility during the ongoing event an audio signal corresponding to the user communication to effectively permit the user to participate in a manner similar to an audience member at the event facility, the projecting means providing an audio output volume level which varies as a function of the number of users communicating information to the event facility.

2. The apparatus of claim 1 wherein the user communication is initiated and the corresponding signal is projected during a sporting event taking place in the event facility.

3. The apparatus of claim 1 wherein the projecting means includes a set of loudspeakers suitably arranged within the event facility.

4. The apparatus of claim 1 wherein the control means further includes:
- a decoder connected to the routing means and operative to receive the user communication therefrom; and
- a controller connected to the decoder and operative to generate the signal provided to the projecting means.

5. The apparatus of claim 4 wherein the controller further includes:
- a traffic distributor for receiving a plurality of user communications on separate input lines from the decoder; and
- volume control means for receiving the user communications and adjusting an intensity level of the signal in response to the user communications.

6. The apparatus of claim 1 wherein the user terminal includes a video terminal and further wherein the user communication is initiated by the user selecting an option displayed on the video terminal.

7. The apparatus of claim 1 wherein the user terminal includes a telephone and the routing means further includes:
- a network service switch connected to the user terminal and operative to receive the user communication;
- an encoder for receiving the user communication from the network service switch and multiplexing the user communication with communications from other users; and
- a multiplexed line connected between the encoder and the control means.

8. The apparatus of claim 7 wherein the routing means further includes a processor for generating at least one pooled call from the user communication and at least one of the communications from other users.

9. The apparatus of claim 1 wherein the routing means further includes a store and forward device operative to store incoming user communications at one time and to forward the communications to the event facility at another later time.

10. The apparatus of claim 1 wherein the routing means further includes an announcement unit operative to provide an announcement to the user indicative of the event.

11. The apparatus of claim 1 wherein the projecting means further includes a video screen in the event facility for displaying a video signal corresponding to information in the user communication.

12. In an effective barrage telecommunication system in which a potentially large number of users communicate information over a network, a method of directing a user communication from a user terminal connected to the network to an event facility with an ongoing event having an audience, comprising the steps of:
- routing information in the user communication to the event facility; and
- projecting in the event facility during the ongoing event an audio signal corresponding to the user communication to effectively permit the user to participate in a manner similar to an audience member at the event facility, such that an audio output volume level projected in the event facility varies as a function of the number of users communicating information to the event facility.

13. The method of claim 12 wherein the step of projecting further includes projecting an audio signal corresponding to information in the user communication over a set of loudspeakers suitably arranged within the event facility.

14. The method of claim 12 wherein the step of projecting further includes projecting a video signal corresponding to information in the user communication over a video screen suitably arranged within the event facility.

15. The method of claim 12 wherein the step of routing information includes routing the user communication from a telephone through a telephone switching network to the event facility.

16. The method of claim 12 wherein the user terminal includes a video terminal and the method further includes the step of the user initiating the user communication by selecting an option displayed on the video terminal.

17. The method of claim 12 wherein the step of routing information in the user communication further includes:
- providing a network service switch connected to the user terminal and operative to receive the user communication;
- receiving in an encoder the user communication from the network service switch; and
- multiplexing the user communication with communications from other users in the encoder.

* * * * *